United States Patent Office 3,454,338
Patented July 8, 1969

3,454,338
STELLAR SPECTROMETER
André J. Girard, Chatillon-sous-Bagneux, and Jean G. Berny, Paris, France, assignors to Office National d'Etudes et de Recherches Aerospatiales, Chatillon-sous-Bagneux, France, a body corporate of France
Filed Feb. 7, 1966, Ser. No. 525,457
Claims priority, application France, Feb. 10, 1965, 5,077, Patent 1,436,616
Int. Cl. G01j 3/42
U.S. Cl. 356—97           3 Claims

ABSTRACT OF THE DISCLOSURE

A stellar spectrometer for use outside the earth's atmosphere and in connection with a telemetering transmitter, comprising optimal means for forming a linear image representing the spectrum of the light of a star, and means for forming the Fourier transform of the said linear image, the latter means including a circular rotating grating having alternate opaque and transparent parts delineated from each other by curves characterized by a suitable polar coordinate equation, and means for impressing the light transmitted through the said grating on a photoelectric cell connected to the said transmitter.

---

The present invention is concerned with the quantitative study of the special distribution of the radiation of a celestial body, in particular in the near infra-red region.

The most common method of spectral analysis of stars consists in utilising an exploring diaphragm to analyze point by point the spectrum of the star, extended along a line by means of a prism. To improve the weak signal-to-noise ratio appertaining to this method, modulation of the luminous flux has been effected, either by means of an interferometer in two parts which are movable with respect to one another or by means of the fringes of an air wedge to obtain the Fourier transform of the spectrum and, as a consequence, to multiply this ratio, with equal power of resolution, by the square root of the total number of analyzed spectral elements.

It is also known that to study the spectrum of a star in the infra-red region, it is advantageous to place the spectrometer on a craft such as a balloon or a rocket in order to put it into the upper layers or outside the atmosphere, the diffusion and in particular the absorption bands of which are a serious obstacle to the propagation of infra-red radiation.

The utilisation in these conditions of the modulating means considered in the above prior art present difficulties by reason of their complexity, the adverse effect on them of vibrations and their sensitivity to disarrangements and in practice it has only been used at small powers of resolution.

The object of the invention is to permit the construction of a stellar spectrometer which is simple and robust and can be launched in this way, enabling a high power of resolution and a high ratio of signal-to-noise to be obtained.

From U.S. application Ser. No. 295,025 filed July 18, 1963, now U.S. Patent No. 3,305,692 in the name of the first present applicant, a process is known for analyzing images by Fourier transform according to which this operation is effected by modulating the radiated flux from narrow bands of the image to be analyzed by displacing a grating of variable transparency in front of the image.

A feature of the stellar spectrometer of the present invention is that the modulation of the luminous flux coming from the spectrum to be analyzed, extended along a line, is effected by the displacement of a grating of variable transparency. The invention will be better understood from a consideration of the following description and of the attached drawings, in which.

Figure 1:
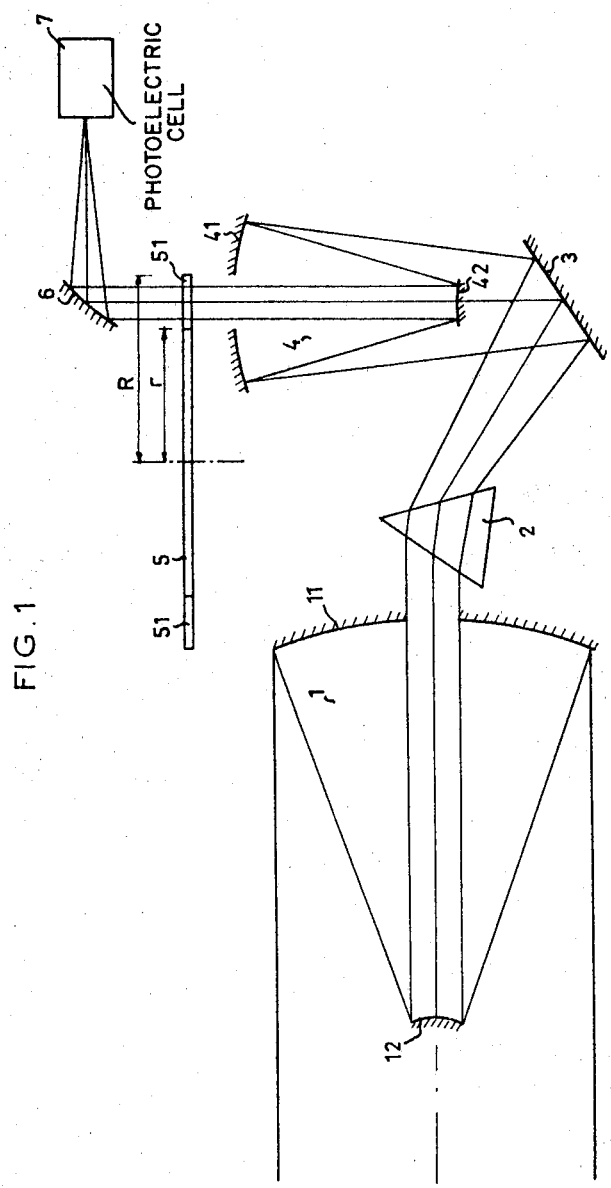
FIG. 1 is a diagram of a stellar spectrometer embodying the invention.

The stellar spectrometer shown in FIG. 1 comprises:

A primary telescope 1 consisting of a parabolic mirror 11 having a central aperture and a convex parabolic mirror 12 of the same diameter as the central aperture of the mirror 11, the system being afocal;

A prism 2 of a material transparent to the near infra-red region, for example of thallium iodo bromide;

A plain mirror 3 intended to deflect the beam in order to limit the bulk of the assembly;

A secondary telescope 4 consisting of a concave mirror 41 having a central aperture and a convex mirror 42 or pupil of diameter substantially equal to that of the central aperture of the mirror 41;

A grating 51 made by photographic reduction of a drawing on a large scale and photogravure on a support 5 transparent to the near infra-red region, arranged in the focal plane of the secondary telescope 4;

A concave mirror 6 intended to receive the flux coming from the pupil and modulated by the grating 51, in order to concentrate it on a photoelectric cell 7 sensitive to the infra-red range in question, for example of lead sulphide or indium antimonide.

When the primary telescope 1 is pointed towards a star to be observed; it concentrates on the prism 2, the light flux falling on the parabolic mirror 11. The secondary telescope 4 forms on the grating 51 the linear image of the spectrum of the star, spread by the prism 2 along a line perpendicular to its apex edge.

Figure 2:
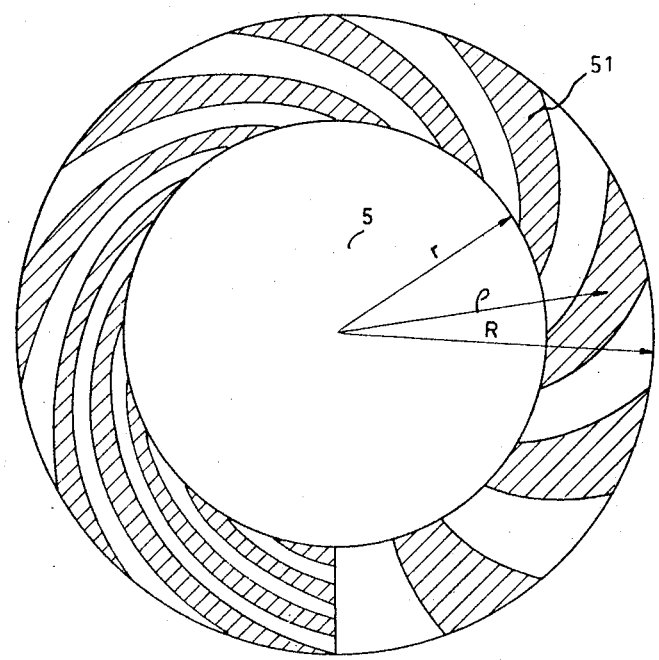
FIG. 2 shows one embodiment of a modulation grating for the stellar spectrometer of FIG. 1.

The grating 51 is formed, as shown in FIG. 2, at the periphery of the circular support 5 and constitutes an annular surface bounded by circles of radii $r$ and $R$. It is formed by a network of curves defining zones which are alternatively opaque and transparent and which are arranged in such a manner that any circle of radius $\rho$ included between $r$ and $R$ is divided by these curves into equal parts the angular aperture of which is proportional to $\rho$, and that in consequence when the disc 5 rotates, the luminance of each element of the linear image formed radially on the grating 51 is modulated at a frequency inversely proportional to the distance of this element from the centre of the disc 5.

The light flux received by the cell 7 and converted by the latter into an electric signal is consequently the Fourier transform of the spectral distribution of the radiation from the observed star.

This electric signal, which contains all the data derived from the analyzed stellar spectrum is transmitted, for example over a telemetering channel, to a station equipped to effect the inverse Fourier transformation.

This transformation can be effected, as is known, in a digital or an analogue manner. In the latter case, the received signal controls a source of variable brightness, for example a light source of the "Sylvania Glow modulator" type, which exposes a photographic plate through a slit in front of which a grating similar in all respects to the grating 51, moves in synchronism with the latter. Each point of this slit receives a flux modulated at a given frequency and the corresponding element of the photographic plate integrates the light flux between the origin and the end of the signal.

What we claim is:

1. A stellar spectrometer to be carried on a craft provided with a telemetering transmitter to operate outside the earth's atmosphere, comprising a primary telescope to be pointed at a star, a prism forming a spectrum of the light received from the said star along a line, means for forming a radial linear image of the said line on a rotating circular grating of variable transparency and means for converting the light flux modulated by the said grating into an electric signal for transmission over a telemetering channel, characterized in that the said grating includes alternatively opaque and transparent parts delineated from each other by curves and arranged in such a manner that any circle having an intermediate radius between the minimum and maximum radii of the said grating is divided by the said curves into equal parts the angular aperture of which is proportional to the said radius, whereby during the rotation of the said grating the luminance of each element of the said radial linear image formed on the said grating is modulated at a frequency inversely proportional to the distance of the latter element from the rotation axis of the said grating.

2. A stellar spectrometer in accordance with claim 1 wherein said means for forming the image of the said line comprise a second telescope which projects the said image on a radius of the said rotating circular grating and the said means for converting the modulating light flux comprise a concave mirror concentrating the light flux modulated by the movement of the said grating and a photocell converting the said concentrated modulated flux into an electric signal.

3. A stellar spectrometer in accordance with claim 1, wherein said grating is formed on an annular surface of a transparent circular support in the spectral region of the light to be analyzed.

References Cited

UNITED STATES PATENTS

| | | |
|---|---|---|
| 2,750,836 | 6/1956 | Fastie |
| 3,025,744 | 3/1962 | Collyer et al. |
| 3,246,557 | 4/1966 | Mertz et al. _____ 250—237 X |
| 3,305,692 | 2/1967 | Girard _____ 250—237 |
| 3,312,824 | 4/1967 | Cook. |

RONALD L. WIBERT, *Primary Examiner.*

F. L. EVANS, *Assistant Examiner.*

U.S. Cl. X.R.

250—83.3, 233, 237; 350—168, 204, 294